Patented Feb. 17, 1925.

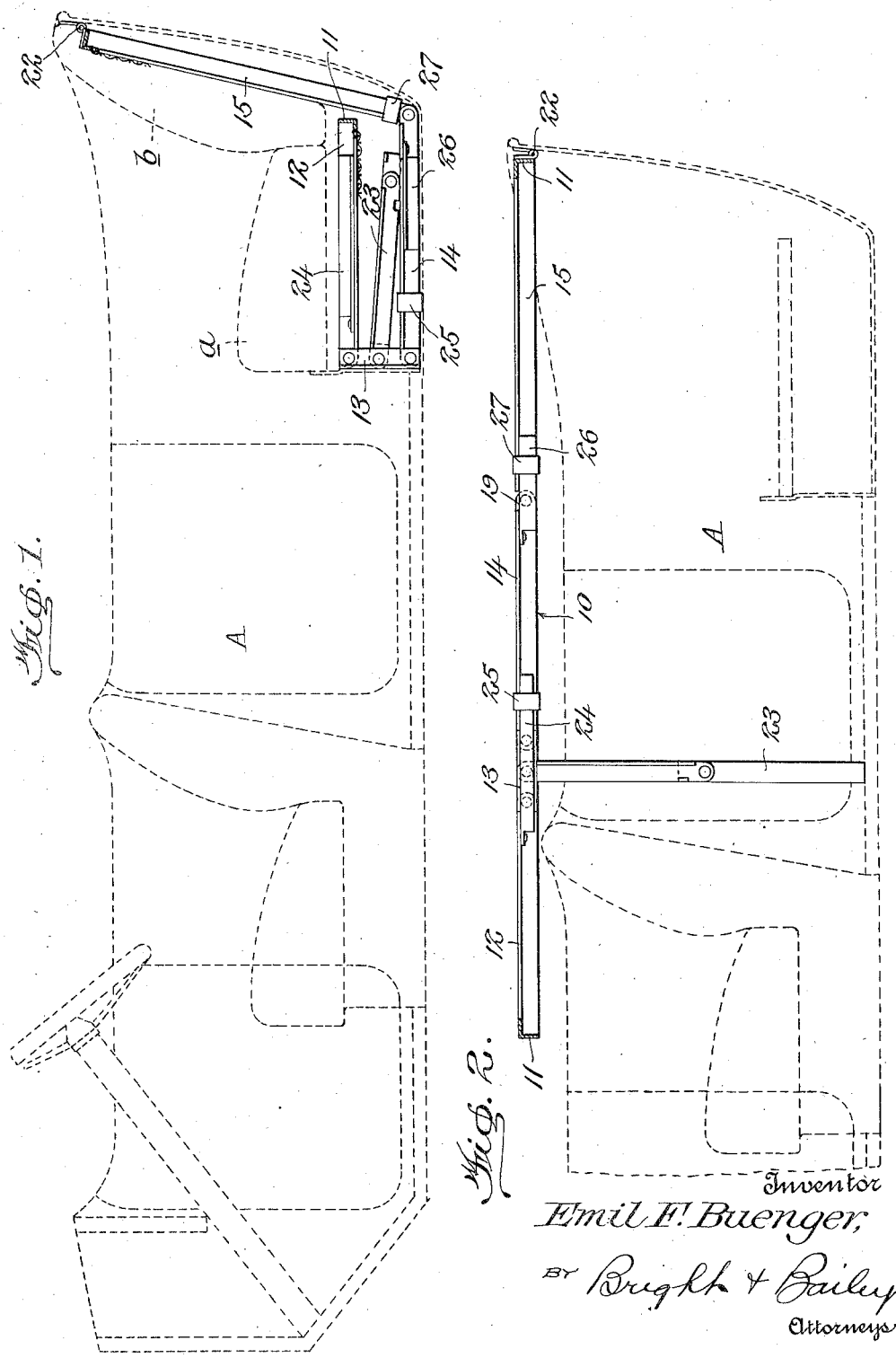

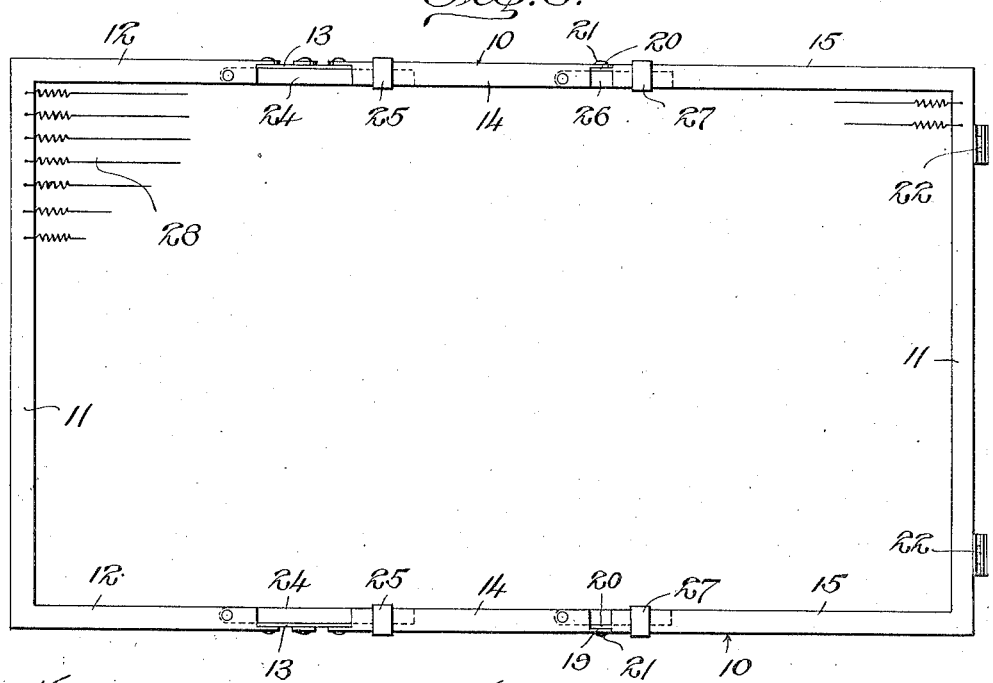

1,526,739

UNITED STATES PATENT OFFICE.

EMIL F. BUENGER, OF NEW ULM, MINNESOTA.

BED ATTACHMENT FOR AUTOMOBILES.

Application filed August 29, 1923. Serial No. 659,970.

*To all whom it may concern:*

Be it known that I, EMIL F. BUENGER, a citizen of the United States, and resident of New Ulm, in the county of Brown and State of Minnesota, have invented certain new and useful Improvements in Bed Attachments for Automobiles, of which the following is a specification.

My invention relates to attachments for automobiles, and my object is to provide a bed frame so designed and adapted to be so associated with an automobile as to be foldable into a concealed position normally and extended into an operative position when desired for sleeping purposes.

More particularly it is my object to provide an improved foldable and extensible bed frame and to permanently associate and so connect the same with an automobile that it may readily and easily be extended for use and that in its folded position will lie within a space conveniently provided for it beneath the rear seat and behind the associated back cushion of the automobile.

My improved bed frame is composed of plural sections whereby it may be folded and extended as aforementioned, and it is my further object to provide improved connections between the respective sections which connections are of simple construction and capable of ready and easy manipulation to permit folding of the sections or to hold the latter rigidly and firmly in extended position.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views;—

Fig. 1 is a view partly in section and partly in elevation showing my improved bed frame operatively associated with an automobile and in its folded, concealed position;

Fig. 2, a view similar to Fig. 1 showing the bed frame in extended position for use;

Fig. 3, a plan view of the bed frame;

Fig. 4, a perspective showing in separated relation the parts constituting one of the joints between related sections of the bed frame;

Fig. 5, a plan view of the assembled parts shown in Fig. 4;

Fig. 6, an elevation of the joint between related frame sections as shown in Fig. 5; and Fig. 7, a transverse section on the line 7—7 of Fig. 5.

Referring now to the drawings in detail, it will be observed that my improved bed frame when extended is of conventional design in that it is of elongated rectangular shape and is composed of side rails 10, 10 connected by end rails 11, 11.

The side and end rails 10, 10 and 11, 11 are formed preferably from angle iron as is usual in bed frame construction and, as shown, side rails 10, 10 are formed of plural relatively extensible and foldable sections in accordance with the intent and purpose of my invention previously outlined.

In the present embodiment of my invention each of the side rails 10, 10, which rails are of duplicate construction, is formed of four sections, designated, respectively, 12, 13, 14 and 15, and as shown ears 16 and 17 are formed respectively on the adjacent ends of sections 12 and 14, and the ends of section 13 are disposed in overlapping relation to these ears and are connected therewith by pins or rivets 18 so that said sections are capable of relative angular pivotal movement. Sections 14, 14 are provided also at their other ends with ears 19 that overlap ears 20 provided on the adjacent ends of sections 15 and pins or rivets 21 are extended through these ears whereby sections 14, 14, and 15, 15, are connected for relative angular pivotal movement.

One of the end rails 11 connects the outer ends of sections 12, 12; and the other of said end rails connects the outer ends of sections 15, 15.

Hinges 22 are secured to the end rail 11 that connects sections 15, 15 and these hinges also are secured to the back and near the top of the body of the automobile designated generally at A whereby sections 15, 15 are pivotally connected with the body for movement either to a position substantially parallel with the back of the body *a* as shown in Figure 1 of the drawings, or to a position at substantially right angles to and forwardly of the back of the body A as shown in Figure 2 of the drawings.

When the bed frame is folded as shown in

Figure 1 it is disposed entirely beneath the back seat *a* and the back cushion *b* of the automobile, the sections 14, 14 lying adjacent to and paralleling the bottom of the body A, the sections 13, 13, lying vertically adjacent to the front of the supporting structure for seat *a*, and the sections 12, 12 lying adjacent to and paralleling the under side of seat *a*, the pivotal connections between the respective sections of the bed frame permitting this foldable relation and enabling me to utilize the space usually provided under the rear seat of an automobile for purposes of storing and concealing my bed frame when it is not in use as is apparent.

To secure an erected or extended position of my bed frame from its position shown in Figure 1, the rear seat cushion *a* and the removable back cushion *b* are removed and the respective sections constituting the side rails 10, 10 unfolded to the position shown in Figure 2, in which position they are secured by latch means associated with the connections between the sections and supported by leg members 23 which are pivoted to sections 13, 13 whereby they are capable of being swung downward into engagement with the floor of the automobile.

The latch means for securing the sections 12, 13 and 14 of the side rails against collapse from the erected position shown in Figure 2 are of duplicate construction and each consists of an angle iron member 24 pivoted at one end to section 12 so that its other end may be swung into overlapping relation with section 14, in which position it may be retained by a sleeve 25 slidable on the latter section. In this connection it is important to note that the horizontal flanges of angle iron sections 12 and 14 are disposed upwardly and the corresponding flange of section 13 is disposed relatively downward, so that when angle iron member 24 is swung to its locking position one flange thereof engages the horizontal flanges of sections 12 and 14 and the other flange thereof engages the horizontal flange of section 13, or in other words member 24 is disposed between corresponding flanges of sections 12, 13 and 14 which manifestly results in an extremely rigid and sturdy connection between the sections. Moreover, by manipulating sleeve 25 member 24 may be swung out of locking relation with respect to sections 12, 13 and 14 with comparatively little effort or exertion in order to permit folding of said sections.

The latch means for securing sections 14 and 15 against collapse from an erected position consist of angle iron members 26 similar to members 24, pivoted at one end to section 14 whereby they may be swung into overlapping relation with section 15 and retained in such position by sleeves 27 slidably arranged in the latter section.

A spring 28 of any well known or preferred type is stretched between the end rails 11, 11 and is foldable with the sections constituting side rails.

From the foregoing description considered in connection with the accompanying drawings, it is believed that the construction, operation and advantages of my improvements will be fully understood. It is desired to point out, however, that various changes, modifications and desirable additions may be made in and to the structural arrangement shown within the spirit and scope of my invention as defined in the appended claims.

I claim:—

In a collapsible and extensible bed frame, a side rail including an intermediate and outside sections arranged in end to end relation and pivotally connected together, said sections being formed from angle iron and each section in cross section including a vertical and a horizontal flange portion, the horizontal flange portions of the outside sections being disposed uppermost and the horizontal flange portion of the intermediate section being disposed lowermost, and an angle iron locking member pivoted to one outside section and adapted to extend across said intermediate section and overlie the other outside section, said member including vertical and horizontal flange portions, the latter of which is disposed uppermost, said member adapted when in locking position to lie between and contact with the horizontal flanges of the outside and intermediate sections, and means on the last named outside section to secure said member thereto.

In testimony whereof I affix my signature hereunto.

EMIL F. BUENGER.